June 4, 1929.  F. H. MEYER  1,715,857
FOOD CONTAINER
Filed April 19, 1926
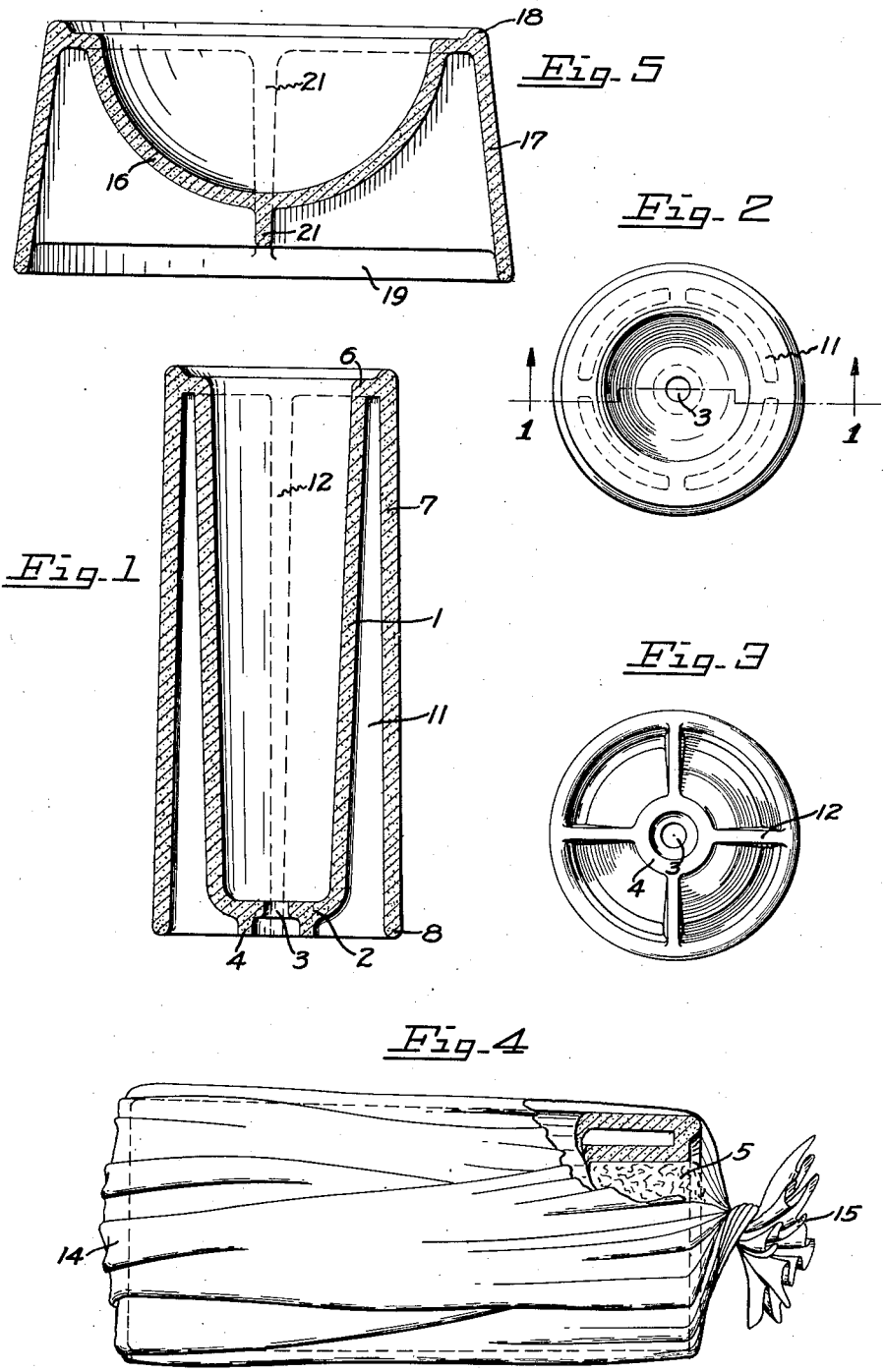
INVENTOR
FERD H. MEYER
By Charles S. Evans
HIS ATTORNEY Patented June 4, 1929.

1,715,857

UNITED STATES PATENT OFFICE.

FERD H. MEYER, OF OAKLAND, CALIFORNIA, ASSIGNOR OF ONE-HALF TO GEORGE H. ROBERTS AND ONE-HALF TO JOSEPH SCHOR, BOTH OF SAN FRANCISCO, CALIFORNIA.

FOOD CONTAINER.

Application filed April 19, 1926. Serial No. 102,851.

My invention relates to a food product, and particularly to an edible shell for holding either a hot or cold filler such as a meat hash or a custard.

One of the objects of my invention is to provide a food container having a crisp outer shell, and an inner shell that may be crisp or soft depending upon the consistency of the filler.

Another object of my invention is to provide an edible food container having an outer shell spaced from the inner shell to provide thermal insulation therefor.

Another object of my invention is the provision of an edible food container formed with a base to hold the container in upright position without the aid of a rack.

My invention possesses other objects and features of advantage some of which with the foregoing will be set forth in the following description of the preferred form of my invention which is illustrated in the drawings accompanying and forming part of the specification. It is to be understood that I do not limit myself to the showing made by said drawings and description, as I may adopt variations of the preferred form within the scope of my invention as set forth in the claims.

Referring to the drawings:

Figure 1 is a vertical sectional view of the container of my invention. The plane of section is indicated by the line 1—1 of Figure 2.

Figure 2 is a top view, and Figure 3 is a bottom view of the food container.

Figure 4 is a side elevation of a filled and wrapped container, portions of the wrapping and the shell being broken away to show the structure.

Figure 5 is a vertical sectional view of a modified form of my invention.

Broadly my invention comprises a food container made of an edible material and comprising two suitably shaped integral shells. The inner shell is intended to receive a filler of some suitable foodstuff, either hot or cold. Surrounding and spaced from the inner shell is an outer shell, one end of which is preferably formed to provide a base on which the food container may rest to hold it in upright position. The space between the walls is substantially a dead air space and this provides a thermal insulation for the inner shell. Since the outer shell is spaced from the inner shell it is not softened by any moisture that may be contained in the food filler in the inner shell, so that the outer shell always remains crisp. The product of my invention may be eaten in the hands as a sandwich or roll, or it may be eaten on a plate. The food container with the filler can be sold over the counter for immediate consumption, or it may be wrapped and eaten at a later time. In either case the condition of the container will be the same.

In detail the food container of my invention comprises an inner shell 1, made of an edible material such as a baked batter or pastry material, and thick enough to provide sufficient strength. I prefer to make the inner shell in a generally conoidal shape, closing the small end 2 to form a bottom in which the aperture 3 is preferably left to permit the escape of air when the filler is introduced. An annular flange 4 reenforces the bottom. This inner shell when baked is crisp and into it is packed a filler 5 of any suitable foodstuff, for example a meat hash. The steam or moisture from the filler will tend to soften the inner shell so that after a time it will become similar to a thin layer of soft bread surrounding the filler.

Integrally united to the open or larger end 6 of the shell 1 is an outer oppositely converging conoidal shell 7 of similar material and thickness. This shell flares outwardly so that its open lower end 8 forms a stable base for holding the food container in an upright position. This will be found particularly advantageous both from the standpoint of the dealer and the consumer. The shell 7 is preferably spaced from the shell 1, except at the end 6 where the two shells are integrally united, so that an air space 11 is formed between the inner and outer shells. When the container is resting in upright position on a table or other flat surface, all circulation of air around the inner shell is prevented, and a thermal insulation of high efficiency is provided. Thus a hot filler in the inner shell will remain hot longer than it would under other conditions, and a frozen confection will not melt so readily.

The outer shell 7 being spaced from the inner shell, does not absorb any of the moisture or steam from the filler, and remains crisp. This crispness is desirable because it makes the article easy to handle, but chiefly because it adds materially to its attractiveness as a food product.

Reinforcing ribs 12 integral with the shells are provided at spaced intervals between them to provide added support for the inner shell when it is softened by the filler and in general to form a more rigid structure. These ribs preferably extend flush with the lower edge of the outer shell and the flange 4.

It will be apparent without special illustration that the space of air chamber 11 may also be filled with a suitable filler, so that a larger variety of flavors or kinds of food may be combined into one product. For example, one kind of an ice cream may be put into the inner shell and another kind put into the space 11.

In Figure 4 I have shown the finished product wrapped. Wrapping is not essential, but in many cases it will be desirable, and is best accomplished by placing the stuffed roll in the center of a piece of waxed or tissue paper 14 and turning the edges into a twist 15. If desired, the wrapper at both ends may be twisted to simulate a tamale.

My invention contemplates the production of a stuffed roll such as is illustrated in Figures 1, 2, 3, and 4, or an edible disk-like container such as that shown in Figure 5.

In this later case, the inner shell 16 is a cup shaped container and accordingly is wider and not as deep as the inner shell in the other type of container. The outer shell 17 is formed integral with the shell 16 and is united thereto around the open upper edge. Disposed around the top of the container adjacent the outer edge is a bead 18 which protects and strengthens the structure at this point and improves the appearance of the finished product. The periphery of the bottom of the outer shell is preferably greater than the periphery of the top so that a more stable base for the container is provided.

A plurality of integral reinforcing ribs 21 extend between the inner and outer shells from the point of junction between the shells to a point below the bottom of the inner shell and above the lower edge of the outer shell. It will be seen that neither the ribs nor the bottom of the inner shell contact with the surface on which the container rests, but are supported by the annular flange 19 formed by that portion of the outer shell extending below the ribs. In packing, the empty containers are nested together, the bead 18 bearing against the bottom of the ribs 21.

This latter form of my invention is particularly adapted for use in restaurants or ice cream parlors, for it may be used in place of a dish.

I claim:

1. A double walled food container comprising edible inner and outer shells integrally united at one end, said shells having opposite ends open.

2. A double walled food container comprising edible oppositely tapering spaced inner and outer shells integrally united at one end, and integral reinforcing ribs disposed between said shells.

3. An edible food container comprising a tapering inner shell and an oppositely tapering outer shell integrally united to the inner shell.

4. An edible food container comprising a tapering inner shell closed at the small end, and a tapering outer shell integrally united to the open end of the inner shell.

5. An edible food container comprising a tapering inner shell closed at the small end, and a tapering outer shell having its small end integrally united to the open end of the inner shell.

6. An edible food container comprising a tapering inner shell closed at the small end, a tapering outer shell having its small end integrally united to the open end of the inner shell, and integral reinforcing ribs interposed between said shells.

7. A food product comprising an inner conoidal edible shell integrally formed within an oppositely converging conoidal edible shell.

In testimony whereof, I have hereunto set my hand.

FERD H. MEYER.